Figure 2:
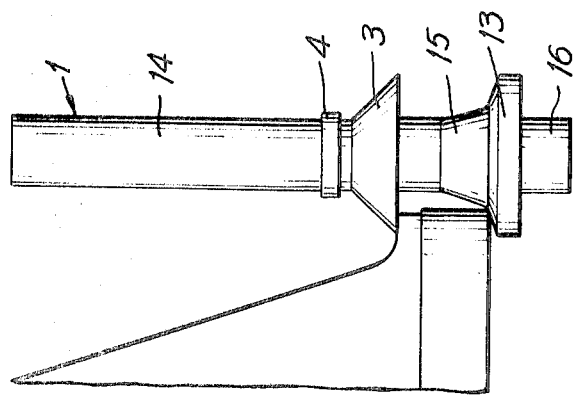

United States Patent

[11] 3,534,710

| [72] | Inventor | Jarl Rune Olde |
| | | Uppsala 10, Vardsatravagen, 71 Sweden |
| [21] | Appl. No. | 672,872 |
| [22] | Filed | Oct. 4, 1967 |
| [45] | Patented | Oct. 20, 1970 |
| [32] | Priority | Oct. 17, 1966 |
| [33] | | Sweden |
| [31] | | 10,470/66 |

[54] AUTOMATIC WATER SUPPLY DEVICE FOR POULTRY
3 Claims, 2 Drawing Figs.

[52] U.S. Cl. .................................................. 119/75,
  137/69, 222/422
[51] Int. Cl. ................................................... A01k 07/02
[50] Field of Search ........................................ 119/72.5,
  75; 137/69; 222/422

[56] References Cited
UNITED STATES PATENTS

| 3,340,852 | 9/1967 | Nilsen | 119/75 |
| 1,811,375 | 6/1931 | Wysong | 119/72.5 |
| 2,614,531 | 10/1952 | Futterer | 119/72.5 |
| 2,690,160 | 9/1954 | Kagan | 119/72.5 |
| 3,008,451 | 11/1961 | Curry | 119/72.5 |
| 3,128,745 | 4/1964 | Alter | 119/75 |
| 3,215,119 | 11/1965 | Graham | 119/75 |
| 3,263,652 | 8/1966 | Nakajima et al. | 119/72.5 |
| 3,322,101 | 5/1967 | Eagles et al. | 119/72.5 |

Primary Examiner—Aldrich F. Medbery
Attorney—Blum, Moscovitz, Friedman, and Kaplan ABSTRACT: An automatic water supply device for poultry wherein water is supplied under pressure to a bowl-shaped container through an aperture in the base of said bowl, a valve disposed in said aperture and having a spindle projecting therefrom, said valve being operable to release water into said bowl by the deflection of said spindle by a body portion of an animal attempting to reach water accumulated adjacent to the base of said container.

Patented Oct. 20, 1970

3,534,710

AUTOMATIC WATER SUPPLY DEVICE FOR POULTRY

The present invention refers to an automatic water supply device for poultry and in particular an automatic device of this type for chickens reared in cages.

Rearing of poultry has been and to an certain extent is still done as a subsidiary activity in smaller farms, the chickens generally not receiving the care required in modern poultry rearing. One still meets chickens strolling about farmhouses and stables in search for food. The animals are forced to quench their thirst by drinking from accidental water pools or by drinking water which possibly once a day or when replanishment is needed is filled into a drinking vessel. No regular cleaning of such drinking vessels will occur.

Obviously, when the chicken is searching for food various types of dirt will adhere to the animal's beak. While the chicken is drinking water in the water vessel these dirt particles will be washed away from the beak and will collect on the bottom of the vessel where they form a favourable substrate for the growth of microbes. Such bacterial colonies when swallowed by the animal will certainly lower the quality of both the meat and the eggs obtained from the chicken.

Both the size and the quality of the eggs are to a very great extent a function of a sufficient supply of fresh water to the chicken. Shortage of water will cause the hen to lay small and bad eggs and the same result will be caused by contaminated water. Various attempts have therefore been made to solve the problems involved in obtaining a satisfactory water supply to chickens. For example, drinking bowls have been arranged in connection with a large water tank supplying water to all these drinking bowls in dependence on water consumption. This solution has the advantage that the chicken always has access to water, however, this water cannot be considered to be fresh water as the water tank possibly contains several day's water supply. Moreover there remains the risk of bacterial growth in contaminated water as the water is not self-cleaning.

In order to cope with the problem caused by contamination of the water in drinking bowls valves of various types have been constructed which are provided with a part adapted to be depressed by the chicken in order to open a water supply line. Devices of this type are described, for example, in U.S. Pat. Nos. 1,646,246, 3,228,377, 2,319,928, 3,008,451 and in British specification 641,507. Moreover devices are known adapted continuously to supply water in excess of the amounts consumed by the chicken, devices of this type obviously involving the risk that pools of water are formed around them.

Only a few of the prior art automatic devices are adapted to be connected to the conventional water supply systems, the water instead being supplied from particular containers or tanks as described above. For, it is a difficult problem to operate a valve adapted to be actuated by a chicken without excess effort at pressures as high as those prevailing in conventional water supply systems.

Several of these prior art valves are adapted to be supported at an elevated level with the valve actuator extending downwardly so that the chicken is compelled to actuate the valve in an upward direction in order to release a drop of water. Such automatic devices do not work satisfactorily because the chicken due to its constitution is unable completely to collect a drop supplied from above. The consequence will be that the chicken only will utilize a part of the water supply while the rest of the water will flow past the beak of the animal.

In modern chicken farms chickens are kept in cages occupied by at most ten chickens per cage. There the chickens are supplied with fodder in predetermined amounts by means of automatic fodder releasing devices or by manual positioning. A presupposition of good egg production is ample supply of water. A normal expedient is the provision of open water conduits passing through adjacent cages and offering a continuous supply of flowing water. However, this system has several drawbacks. On the one hand the water consumption will be unnecessarily large as the chickens will use up only a minor part of the water the greater part of which will be wasted. Moreover a sick chicken drinking from the water may infect other chickens further down stream Open channels or gutters of this type also cannot be used for supplying medicines because too much of the drug would be wasted.

Thus, an object of the present invention is an automatic water supply device for poultry which is free from the above mentioned drawbacks of previously known devices and which comprises a drinking bowl and a valve spindle adapted to be actuated by the bird for releasing a supply of water, said device being characterized in that the bowl has upwardly increasing width and that the valve spindle extends centrally into the drinking bowl through an aperture in the bottom thereof.

Figure 1:
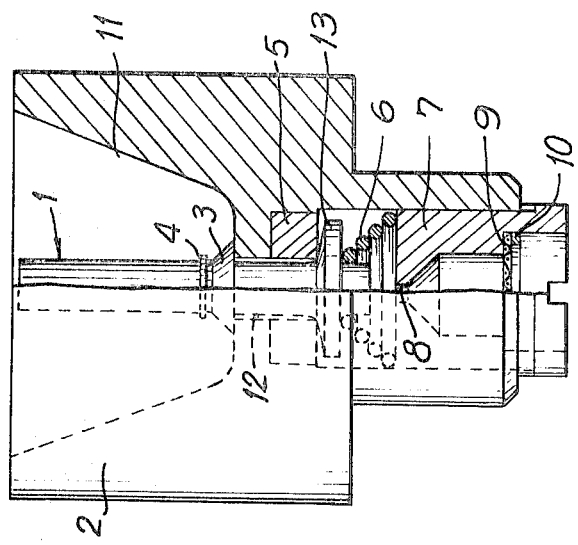

The invention is described in detail by reference to the drawing in which FIG. 1 is a side elevation of the automatic drinking device partly in section and FIG. 2 is a detail view of the valve spindle.

As appears from the drawing the automatic water supply device according to the invention has the following general construction: Through a generally cylindrical body 2 of a plastic material such as nylon having a substantially conical depression 11 positioned axially of the body there extends a valve spindle 1. The end of the body 2 opposite to the drinking bowl formed by the depression 11 is smaller than the main portion of the body containing the drinking bowl 11 and is provided with threads for attachment to a suitable fitting, such as a threaded bore in a water conduit. The smaller part of the body is shaped with a cylindrical recess which is provided with an inner thread for receiving a flow restricting unit 7 and filtering device 9. Between the drinking bowl 11 and the cylindrical recess a thin wall is provided through which extends a bore concentric with the axis of symmetry of the body and having slightly larger diameter than the valve spindle 1 which extends through the bore thus forming a water flow gap between these parts.

In the bottom of the recess and against the wall separating the bowl 11 and the recess a sealing ring or valve seat 5 consisting of rubber or similar material is inserted. Against this seat 5, which is exchangable, valve disc 13 carried by the valve spindle performs its sealing action.

The valve spindle proper comprises a shaft 14 adapted to be actuated by the chicken during drinking. The portion of the spindle 1 extending through the rubber seat 5 is slightly conical so that the valve spindle 1 has downwardly increasing thickness in this zone. The conical portion or centering cone 15 holds the valve spindle in the correct centered position within the rubber seat 5. This centering cone 15 merges in a soft curve into the valve disc 13 proper sealing against the rubber seat 5. Also this disc 13 is cone-shaped in such a way as to flare outwardly from the valve shaft towards the edge, the inclination of the disc surface being approximately 100° in relation to the axis of symmetry of the valve spindle.

The lower face of valve disc 13 is substantially plane and perpendicular in relation to the axis of symmetry of the spindle. The valve spindle itself has a short extension beyond the lower face of valve disc 13, this extension forming a guide for a compression spring 6.

A washer 3 is freely and slidingly supported by valve spindle 1, the lower face of the washer being plane and adapted to rest against the bottom of bowl 11 when the valve is closed. To prevent the washer 3 from moving upwardly along the valve spindle 1 a retaining ring 4 is attached to the spindle above the washer.

Valve disc 13 is held against rubber seat 5 by means of spring 6 which is a coil spring of conical shape. The narrower end of the spring fits around the guide 16 formed by the lower end of the valve spindle 1 and in the tensioned or compressed condition this end of the spring contacts the lower face of valve disc 13. The opposite larger end of the spring rests against the upper side of the flow restricting unit 7 enabling the spring pressure to be adjusted by screwing the unit into or out of the recess in the valve body.

The flow restricting unit 7 in its upper end is provided with a narrow bore 8 restricting the flow passage of the water towards the valve. Upstreams of this bore a filtering device 9 is provided in order to prevent foreign particles from entering into the apparatus and disturbing its function. The filtering device 9 is held in position within the flow restricting unit 7 by means of a snap ring 10 expandingly inserted into a groove provided in the inner wall of flow restricting unit 7.

The cross-sectional shape of the drinking bowl 11 is chosen so that a chicken approaching the bowl 11 for drinking purposes will come into contact with the valve spindle 1 at a predetermined water level. The water supply to bowl 11 is greater than the maximum drinking ability of the animal. Thus starting from a practically empty bowl the drinking procedure will develop as follows: The chicken inserts the beak into the bowl 11. In order to reach the water the animal is forced to insert the beak deeply into the bowl. The head of the animal will come into contact with the shaft 14 of the valve spindle and will move the spindle in a lateral direction. Hereby the water supply will be opened and the water level in bowl 11 will rise in spite of the fact that the chicken is drinking. The chicken will then retire the beak to such an extent that while continuously drinking its head will no longer actuate shaft 14 whereby water supply will come to an end. As the height on which the level will become stationary or will reach an equilibrium position will be a function of the behaviour of the chicken and the shape of its head this level may vary for different animals. Nothing will prevent the animal from uninterruptedly holding the head against shaft 14 so that water will be supplied all the time while the animal is drinking. However a chicken does not naturally drink without interruption but fills its beak with water, lifts its head and turns the beak upward to let the water flow down through the gorge. Accordingly there will be practically no risk of overflow around the apparatus which is a factor of great importance because the cages very often are not provided with drip pans, not even in such cases where several cages are placed one above the other.

When actuated by the chicken the shaft 14 will pivot around a point where the seat 5 abuts disc 13, a water flow gap being opened around seat 5 between seat 5 and valve disc 13 except at the position of the pivot point. This pivot point is dependent on the direction in which shaft 14 has been actuated and may be situated at any place around the inner circumference of seat 5. Water will now flow up under line pressure from the attachment tube through the filter 9, the flow restricting bore 8 which will limit the amount of water but not its pressure, and up through the opened gap between disc 13 and seat 5 and through gap 12 between the centering cone 15 and shaft 14 and the wall. The guide washer 3 which is slidable along shaft 14 with some play will open a gap corresponding the gap formed between seat 5 and disc 13 but directed oppositely thereto. Through this gap opened by washer 3 water will flow into bowl 11. Hereby the inflowing water will be forced to follow a predetermined direction of flow, viz. straight laterally along the bottom of bowl 11 and upwardly along the wall thereof.

Dirt particles collected on the bottom of bowl 11 will be agitated by the inflowing water and will therefore be swallowed by the chicken drinking the water. As cage-reared chickens are given special fodder there is less risk of bacterial growth in fodder residues left in the bottom of the bowl than under conditions in which the chickens freely collect their food in free nature; still, the fodder residues should not be allowed to stay a longer time on the bottom of bowl 11. The construction provided in accordance with the invention will eliminate any risk in this respect.

When the chicken ceases actuating shaft 14 valve 1 will be restored to starting position whereby the valve will be closed. Guide washer 3 which is solid and therefore has appreciable weight will then slide downward along shaft 14 towards the bottom of the bowl 11. This will occur so quickly that no dirt particles will descend and reach the bottom of the bowl below washer 3 before the washer comes into contact with the bottom of bowl 11. This will practically eliminate any risk of dirt particles penetrating into the valve from above and disturbing the function thereof. Any particle which still may penetrate into the space between washer 3 and the bottom of bowl 11 will be forced out from this space together with the water displaced when the washer approaches the bottom of bowl 11.

Retaining ring 4 performs two functions. On the one hand, it will prevent washer 3 from being moved by water pressure towards the upper part of shaft 14 and, on the other hand, it will prevent the chickens from removing washer 3 from the valve.

Spring 6 is adapted to bias valve spindle 1 in an upward direction so that disc 13 will abut against seat 5 with a minimum pressure determined by spring 6. Water pressure will cause disc 13 to abut against seat 5 still more strongly. Thus spring 6 enables the automatic water discharge apparatus to be used at any conventionally applied water pressure ranging upwardly from gravity induced pressure when water is supplied from a tank up to pressures of several $kp/cm^2$. At increased water pressure the device will operate fully satisfactorily even without the provision of spring 6.

The sealing surface of the valve must be as small as possible in order that a chicken shall be able to actuate the valve to open it at normal water supply system pressure of between 2 and 6 $kp/cm^2$. The reason is that the pressure acting upon valve disc 13 is proportional to the sealing surface which in this case is the surface bounded by the circular sealing between seat 5 and disc 13. The smaller the area is the more easily the valve be opened. Certainly the automatic water supply device may be used at considerably higher pressures, however such higher pressures ordinarily will not occur in conventional systems. The transition between valve disc 13 and the centering cone is slightly rounded and seat 5 will seal against this rounded zone or immediately outwardly of this zone against the disc 13 proper. Hereby the sealing zone will have a very restricted area compared with other valves in which the sealing action takes place against the outer edge of the disc, reference being made, for example, to U.S. Pat. No. 2,710,594. Due to the fact that seat 5 consists of rubber or similar resilient material it may assume forms different from a definitely round shape but due to the slight inclination of the valve disc outwardly from the inner edge thereof there will always be sealing contact with the seat. If disc 13 was plane the pivot point would be situated at the outer edge of the disc whereby the lever arm for opening the valve would be extended thus increasing the resistance against actuation of the valve by the chicken irrespective of the fact that the sealing action proper takes place more centrally at the inner edge of seat 5. Thus valve disc 13 always permits satisfactory sealing in spite of comparatively big tolerances in the mounting of seat 5. In addition, the lower surface of disc 13 forms a seat for pressure spring 6 facilitating the tight closing of the valve also at low water pressures.

Centering cone 15 performs a particularly important function. Without this cone the valve spindle 1 after actuation by a chicken might stay in a position displaced from center towards the inner wall of the seat. In this position the valve would stick in such a way that it would release water only if actuated from a directly opposite direction. Hereby the operation of the automatic device would be seriously disturbed. The centering cone 15 eliminates any risk of such jamming of the valve and permits discharge of water upon actuation of valve shaft 14 in any arbitrary direction. Of course, the valve will release water if actuated straight downwardly or substantially downwardly, however, this is a factor of minor importance because poultry in general and chickens in particular are unable to exert the force required in such a case to depress shaft 14.

The importance of the fact that a water supply device for chickens is adapted to operate particularly satisfactorily and easily is underlined by the observation made during studies of the drinking habits of chickens showing that a chicken will actuate a water valve of conventional type up to 1,000 times per day and in certain cases twice as often.

The expert will appreciate the advantages obtained by the apparatus according to the present invention permitting ample water supply without unnecessary waste of water and without forcing the chickens to operate some kind of nipple as intensely as required in prior art valves. Moreover conventional drug supplying means can be connected to the water supply system whereby water containing medicine will be available in the drinking bowl.

The flow restricting unit 7 and the filtering device 9 are of conventional construction and do not appear to require a more detailed description.

The above described automatic water supply device may easily be modified for use by animals other than chickens and any expert will understand that the device may be used for widely different species of birds from small cage-birds to turkeys, ostrichs etc., merely by modifying the size of the device.

I claim:

1. An automatic water supply device for birds comprising a drinking bowl adapted to receive water through a water inlet in the form of an aperture positioned at the bottom of the bowl, the interior dimension of the bowl decreasing toward the bottom thereof; a water source connected to said aperture for providing water from beneath said bowl; a valve seat disposed below said aperture in the bowl, said valve seat being formed with an aperture therethrough in registration with said bowl aperture; valve means including an upstanding spindle extending through said bowl and valve seat apertures and projecting into said bowl, and a valve disc mounted on said spindle beneath said valve seat and normally in sealing engagement with said valve seat, said valve disc having an upper substantially conical surface extending upwardly into said seat, the portion of said spindle in the region of said bowl and valve seat apertures and said bowl and valve seat apertures being dimensioned to permit the pivoting of said spindle about the edge portion of said valve seat aperture which is normally in engagement with the valve disc; means for biasing said valve disc toward said valve seat; a washer slidably mounted on said spindle above said bowl aperture and normally in sealing engagement with said bowl bottom and dimensioned to prevent the passage of particles through said aperture when positioned against said bowl bottom when said valve is closed; and a stop fixedly attached to said spindle for the limiting of the sliding movement of said washer to a position at which said washer directs the flow of water outwardly along the bottom of said bowl when said valve is open, whereby a bird desiring to drink from said bowl will displace said spindle in an axial or angular direction to open said valve, admit water and flush particles away from bowl bottom and valve, said valve means returning to the closed position upon disengagement of said spindle by said bird.

2. A device according to claim 1 wherein the valve seat comprises a resilient material.

3. A device according to claim 2 wherein the bias is provided by a spring engaging beneath said valve disc.